(12) United States Patent
Nakano et al.

(10) Patent No.: US 11,439,874 B2
(45) Date of Patent: Sep. 13, 2022

(54) BALL COLLECTING DRUM AND BALL PICKER

(71) Applicant: YAMABIKO CORPORATION, Tokyo (JP)

(72) Inventors: Kenji Nakano, Tokyo (JP); Ryota Yamada, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 328 days.

(21) Appl. No.: 16/851,036

(22) Filed: Apr. 16, 2020

(65) Prior Publication Data

US 2020/0330833 A1   Oct. 22, 2020

(30) Foreign Application Priority Data

Apr. 19, 2019 (JP) ................................ JP2019-80126

(51) Int. Cl.
*A63B 47/02* (2006.01)
*B65G 29/00* (2006.01)

(52) U.S. Cl.
CPC ............ *A63B 47/021* (2013.01); *A63B 47/02* (2013.01); *B65G 29/00* (2013.01); *A63B 2047/022* (2013.01)

(58) Field of Classification Search
CPC ............ A63B 2220/17; A63B 2102/32; A63B 2047/022; A63B 47/02; A63B 47/00; B65G 29/00; A01G 1/12; G05D 1/0246
See application file for complete search history.

(56) References Cited

U.S. PATENT DOCUMENTS

| | | | | |
|---|---|---|---|---|
| 3,788,506 A | * | 1/1974 | Lee ...................... | A63B 47/021 414/440 |
| 4,645,254 A | * | 2/1987 | Warden .................. | A63B 47/02 414/440 |
| 4,761,026 A | * | 8/1988 | Warden ................ | A63B 47/021 414/440 |
| 5,152,565 A | * | 10/1992 | Dodd ..................... | A63B 47/02 414/440 |
| 5,527,075 A | * | 6/1996 | Jones ................... | A63B 47/021 294/19.2 |

(Continued)

FOREIGN PATENT DOCUMENTS

| | | | | |
|---|---|---|---|---|
| EP | 2145655 | * | 2/2010 | ............. A63B 47/02 |
| JP | S50-53061 U | | 5/1975 | |

(Continued)

*Primary Examiner* — James R Bidwell
(74) *Attorney, Agent, or Firm* — Hauptman Ham, LLP

(57) ABSTRACT

Provided is a ball collecting drum, which is configured to roll on a surface to collect a plurality of balls on the surface. The ball collecting drum includes: a plurality of discs; an annular multi-row groove including annular grooves formed between adjacent discs of the plurality of discs. Ball pockets formed, on an outer periphery of the plurality of discs in the annular groove formed between the adjacent plurality of discs have elasticity to allow entry and exit of a ball, and are continuously formed in each of the annular grooves. Each of the ball pockets has a size so that only one ball is allowed to be held therein. The ball pockets formed in the adjacent annular grooves are formed at positions deviated from each other in a circumferential direction of the annular grooves.

6 Claims, 7 Drawing Sheets

(56) References Cited

U.S. PATENT DOCUMENTS

| | | | |
|---|---|---|---|
| 2006/0125256 A1* | 6/2006 | Hiland | A63B 47/024 294/19.2 |
| 2020/0086182 A1* | 3/2020 | New | A63B 47/02 |
| 2020/0298068 A1* | 9/2020 | Sakai | G05D 1/0088 |
| 2020/0301436 A1* | 9/2020 | Sakai | A63B 47/021 |

FOREIGN PATENT DOCUMENTS

| | | | |
|---|---|---|---|
| KR | 101207283 | * 12/2012 | A63B 47/021 |
| WO | 00/78410 A1 | 12/2000 | |

* cited by examiner

BALL COLLECTING DRUM AND BALL PICKER

CROSS REFERENCE TO RELATED APPLICATIONS

This application is based upon and claims the benefit of priority under from the prior Japanese Patent Application No. 2019-80126, filed on Apr. 19, 2019, the entire contents of which are hereby incorporated by references.

BACKGROUND

1. Field of the Invention

This disclosure relates to a ball collecting drum configured to roll on a surface to collect a plurality of balls scattered on the surface. This disclosure also relates to a ball picker including the ball collecting drum.

2. Description of the Related Art

There is known a golf ball collecting vehicle as a kind of ball picker. The golf ball collecting vehicle is configured to collect a plurality of golf balls scattered on a lawn at, for example, a golf driving range. As an example of the golf ball collecting vehicle described above, the following golf ball collecting vehicle is described in Japanese Unexamined Utility Model Publication No. S50-53061.

The golf ball collecting vehicle includes caster wheels or steering wheels provided to a rear part of a frame and a ball holding drum provided to a front part of the frame. The ball holding drum has an annular multi-row groove including a plurality of grooves. The grooves of the multi-row groove are formed so as to be close to each other. The ball holding drum is a freely rolling drum, which is used in a state of being in contact with a ground surface, and rolls on the ground surface as the frame moves. The multi-row groove of the ball holding drum is formed by a plurality of discs, which are arranged at equal intervals and integrated with each other. Each of the discs is formed of an elastic member. A golf ball is held between adjacent ones of the discs owing to elasticity of each of the discs. A ball releasing part having a comb-like shape is arranged at an upper part of the ball holding drum so as to be held in a state of being inserted into the multi-row groove. The golf balls continuously picked up from the ground surface to be held in the multi-row groove are brought into contact with the ball releasing part so as to be picked out from the ball holding drum. A collecting case is arranged on the frame. The golf balls, which have been picked out by the ball releasing part, are accommodated in the collecting case.

With the golf ball collecting vehicle, the golf balls can easily be collected by merely moving the golf ball collecting vehicle forward by human-power drive or motive-power drive toward the golf balls scattered on the ground surface. As a result, collection efficiency can be significantly improved.

Further, in Japanese Unexamined Utility Model Publication No. S50-53061, the following advantages are described. When a recessed portion configured to hold the golf ball is formed on each of side surfaces of each of the V-shaped grooves of the ball holding drum, the golf ball can be more reliably held. Further, when a rib-shaped stop portion is provided in each of the recessed portions adjacent to each other, the elasticity of each of ball holding wheels of the ball holding drum is increased. A suitable degree of firmness for holding the golf balls is obtained.

In the related-art golf ball collecting vehicle, however, as is apparent from FIG. 3 of Japanese Unexamined Utility Model Publication No. S50-53061, the recessed portions for holding golf balls are arranged at such positions that the recessed portions of one of the annular grooves adjacent to each other and the recessed portions of another one of the annular grooves adjacent to each other are lined up in an axial direction of the golf holding drum. Thus, when the golf balls are simultaneously held between the recessed portions of one of the annular grooves adjacent to each other and between the recessed portions of another one of the annular grooves adjacent to each other at such positions that the golf balls are lined up in the axial direction of the golf holding drum, an outlet formed by ends of the recessed portions is less likely to be opened at the time of release of the golf balls by the ball releasing part. Thus, the golf ball may remain in an unreleased state (remain in a held state) in the ball holding drum.

In particular, when the golf balls are simultaneously held between the recessed portions of three or more annular grooves adjacent to each other at such positions that the golf balls are lined up in the axial direction of the golf holding drum, the outlet formed by the ends of the recessed portions is further less likely to be opened at the time of release of the golf balls by the ball releasing part. Thus, the golf balls cannot be smoothly picked out by the ball releasing part, and the ball holding drum is brought into a locked state. As a result, rotation of the ball holding drum is stopped in some cases.

Further, even when the golf balls are simultaneously held in a plurality of annular grooves, which are not adjacent to each other, at such positions that the golf balls are lined up in the axial direction of the ball holding drum, the plurality of golf balls are simultaneously brought into contact with the ball releasing part. Thus, when a force required for simultaneously picking out the plurality of golf balls is larger than a rotational force of the ball holding drum, the rotation of the ball holding drum is stopped as in the case described above.

Even when the problem described above occurs in an unmanned self-propelled ball collecting robot described in, for example, WO 00/78410 A1, the robot continues moving and appears to be performing ball collection work. In reality, however, the balls are not collected. Thus, until an administrator of the robot notices the abnormality, the robot needlessly continues traveling. As a result, work efficiency is very poor, and large robot operation energy is lost.

SUMMARY

This disclosure has been made in view of the problems described above, and has an object to provide a ball collecting drum, with which both of pickup and release of balls can be reliably performed.

This disclosure has another object to provide a ball picker including the ball collecting drum.

According to at least one embodiment of this disclosure, there is provided a ball collecting drum, which is configured to roll on a surface to collect a plurality of balls on the surface, the ball collecting drum including: a plurality of discs; an annular multi-row groove including annular grooves formed between adjacent discs of the plurality of discs; and ball pockets formed, on an outer periphery of each of the plurality of discs, in the annular groove formed between the adjacent plurality of discs, the ball pockets each having elasticity to allow entry and exit of a ball and being continuously formed, the ball pockets each having a size so that only one ball is allowed to be held therein, the ball pockets formed in the adjacent annular grooves being formed at positions deviated from each other in a circumferential direction of the annular grooves.

According to the at least one embodiment of this disclosure, when the ball collecting drum rolls on the surface, the balls on the surface enter the ball pockets one by one and are held therein owing to the elasticity of the ball pockets. The ball pockets formed in the adjacent annular grooves are formed at positions deviated from each other in a circumferential direction of the annular grooves. Thus, positions of the balls held in the ball pockets of the one of the annular grooves adjacent to each other and positions of the balls held in the ball pockets of the another one of the annular grooves adjacent to each other are deviated from each other in the circumferential direction of the annular grooves. Unlike the related-art ball collecting drum, according to the embodiment of this disclosure, the balls are not simultaneously held in the annular grooves adjacent to each other at such positions that the balls are lined up in an axial direction of the ball collecting drum. Thus, a ball holding force cannot become excessively large at the time of release of the balls from the ball pockets. Thus, the balls can be reliably released by a ball releasing part, which is included in the ball picker.

According to at least one embodiment of this disclosure, inner surfaces of each of the ball pockets, which are opposed to each other, may be flat surfaces, and each of the ball pockets may have a width so that the ball is allowed to move along the flat surfaces in each of the ball pockets. According to the at least one embodiment of this disclosure, the balls can be more reliably released by the ball releasing part, which is included in the ball picker.

According to at least one embodiment of this disclosure, a peripheral edge of each of the plurality of discs may be formed to have a rhombic sectional shape having a long axis in a radial direction of the disc. According to the at least one embodiment of this disclosure, smoothness of the entry and the exit of the ball into and from each of the ball pockets can be improved while ball holding performance of each of the ball pockets is maintained.

According to at least one embodiment of this disclosure, the multi-row groove may be formed of an assembly of a plurality of discs, each having the same structure, ridges extending in a radiation direction of the discs, which are configured to define and form the ball pockets, may be arranged at equal angles at a pivot of each of the plurality of discs, and the ridges formed on the respective surfaces of the plurality of discs are formed at positions deviated from each other in a circumferential direction of the plurality of discs. According to the embodiment of this disclosure, the ball collecting drum can be manufactured by assembling the plurality of discs, each having the same structure. Thus, the ball collecting drum can easily be manufactured.

According to at least one embodiment of this disclosure, there is provided a ball picker, including: a machine body, which is movable and includes the above-mentioned ball collecting drum; a ball releasing part, which is arranged on the machine body so as to be inserted into the annular grooves, and is configured to release a ball picked up by the ball collecting drum from the ball collecting drum; and a collecting case configured to accommodate the ball released by the ball releasing part. The machine body may be a self-propelled type one to be driven by motive power, or may be, for example, a handcart-type one to be driven by human power.

With the ball picker according to the at least one embodiment of this disclosure, the same actions and effects as those of the ball collecting drum can be fulfilled.

According to the at least one embodiment of this disclosure, the ball picker further includes a contact-type count sensor configured to count the number of balls released from the ball collecting drum. Each of the annular grooves is formed between discs adjacent to each other. Ridges extending in a radiation direction of the discs, which are configured to define and form the ball pockets, are formed on respective surfaces of the discs adjacent to each other, the surfaces being opposed to each other. The count sensor is arranged on trajectories of the balls to be guided in the radiation direction by the ball releasing part and the ridges.

According to the at least one embodiment of this disclosure, the count sensor is arranged on the trajectories of the balls to be guided in the radiation direction by the ball releasing part and the ridges. Thus, the balls released from the ball collecting drum by the ball releasing part reliably come into contact with the count sensor. Thus, the number of collected balls can be accurately grasped. Further, the ball pockets formed in the adjacent annular grooves are formed at positions deviated from each other in a circumferential direction of the annular grooves. Thus, the balls in the ball pockets of the one of the annular grooves adjacent to each other and the balls in the ball pockets of another one of the annular grooves adjacent to each other come into contact with the count sensor at timings different from each other. Thus, the balls can be accurately counted by the count sensor.

DESCRIPTION OF THE EMBODIMENTS

Embodiments of the present invention are described below with reference to the attached drawings.

Figure 1:
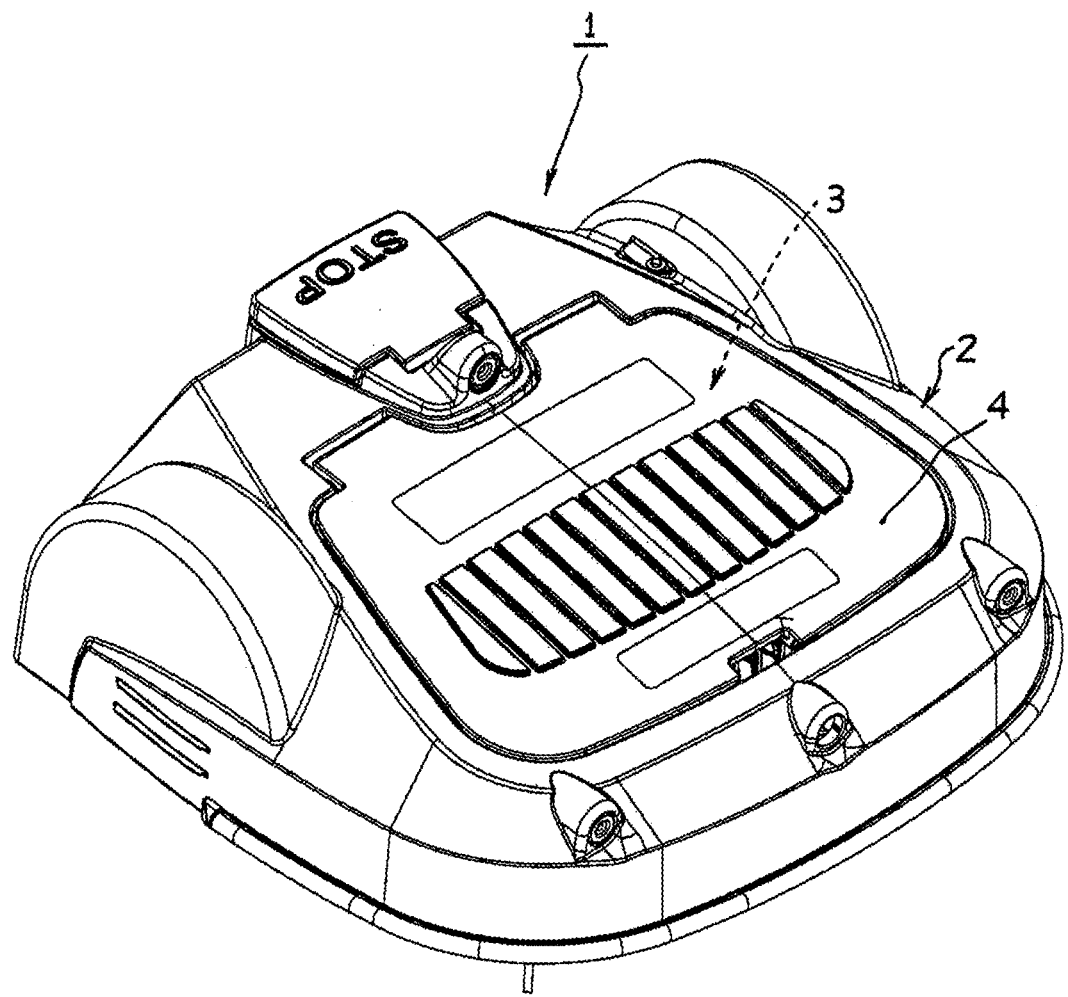
FIG. 1 is an overall perspective view for illustrating an example of a ball picker including a ball collecting drum according to one embodiment of this disclosure.

A ball picker 1 of FIG. 1 according to an embodiment of this disclosure is an unmanned self-propelled ball picker, and is configured to collect balls while traveling by itself on a surface on which a plurality of balls are scattered. The ball picker 1 of FIG. 1 is typically used to collect a plurality of golf balls scattered on a ground surface at a golf driving range. The ball picker 1 includes a machine body cover 2, which is open downward. A picker main body 3 is covered with the machine body cover 2.

Figure 2:
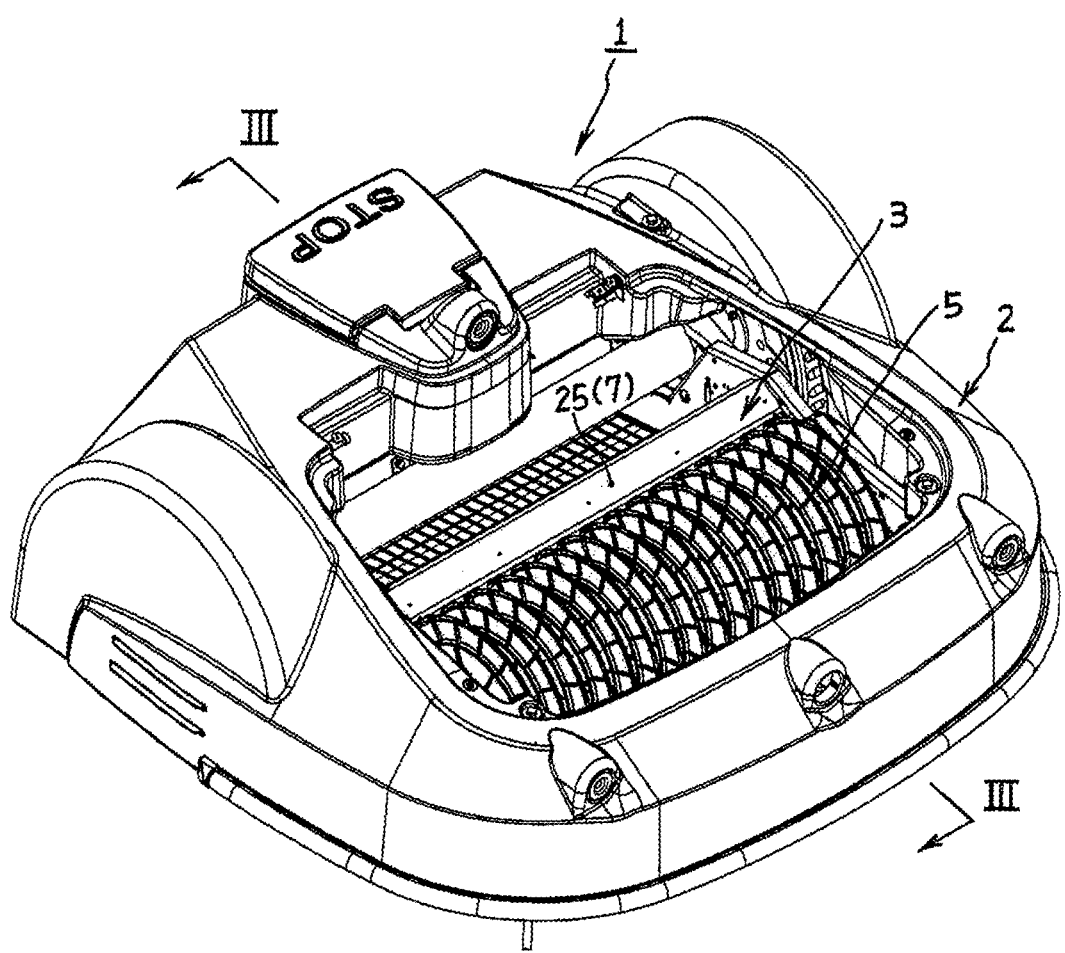
FIG. 2 is a perspective view for illustrating a state in which a ball collecting drum cover is removed from the ball picker of FIG. 1.

FIG. 2 is an illustration of a state in which a ball collecting drum cover 4 provided on the machine body cover 2 is removed from the ball picker 1 of FIG. 1. The ball collecting drum cover 4 is mountable to and removable from the machine body cover 2. After the ball collecting drum cover 4 is removed, a ball collecting drum 5 is exposed. Thus, the ball collecting drum cover 4, which is removable from the machine body cover 2, is convenient for maintenance of the ball collecting drum 5.

Figure 3:
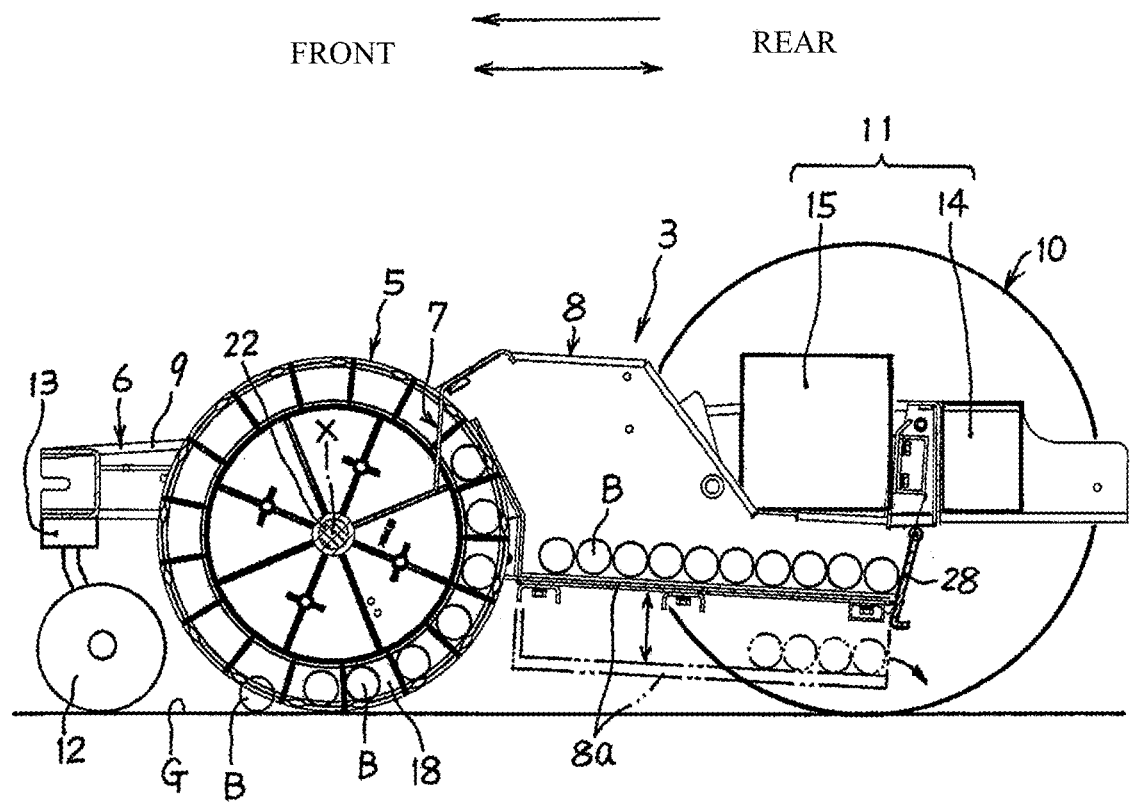
FIG. 3 is a sectional view of the ball picker of FIG. 2 taken along the line III-III as seen in the direction indicated by the arrows, from which a machine body cover is omitted.

As illustrated in FIG. 3, the picker main body 3 includes a traveling machine body 6, the ball collecting drum 5, a ball releasing part 7, and a ball collecting case 8. The traveling machine body 6 corresponds to a machine body movable on the surface.

As illustrated in FIG. 3, the traveling machine body 6 includes, for example, a frame 9, a pair of driving wheels 10, 10, a driving unit 11, a pair of steering wheels 12, 12, and a steering controller 13. The pair of driving wheels 10, 10, specifically, right and left driving wheels 10, 10 are arranged at a rear part of the frame 9. The driving unit 11 is configured to drive the driving wheels 10, 10. The pair of steering wheels 12, 12, specifically, right and left steering wheels 12, 12, are arranged at a front part of the frame 9. The steering controller 13 is configured to control the steering wheels 12, 12. The driving unit 11 includes a storage battery 14 and an electric motor 15. The storage battery 14 corresponds to a power supply. The electric motor 15 is driven by the storage battery 14. The driving wheels 10, 10 are rotationally driven by the driving unit 11 to move the traveling machine body 6. The movement of the traveling machine body 6 is automatically controlled in accordance with a predetermined program. As a result, a traveling direction of the traveling machine body 6 is automatically changed so that the traveling machine body 6 fully travels over a region on which ball collection is required.

The ball collecting drum 5 is arranged between the pair of steering wheels 12, 12 and the pair of driving wheels 10, 10 in a front-and-rear direction of the ball picker 1. The ball collecting drum 5 is idly rotatable about an axis X extending in a right-and-left direction of the traveling machine body 6, and is supported on the frame 9 so that an outer peripheral surface of the ball collecting drum 5 is constantly held in contact with a ground surface G. The ball collecting drum 5 collects a plurality of balls B scattered on the ground surface G while rolling on the ground surface G along with the travel of the traveling machine body 6 in a forward direction.

Figure 4:
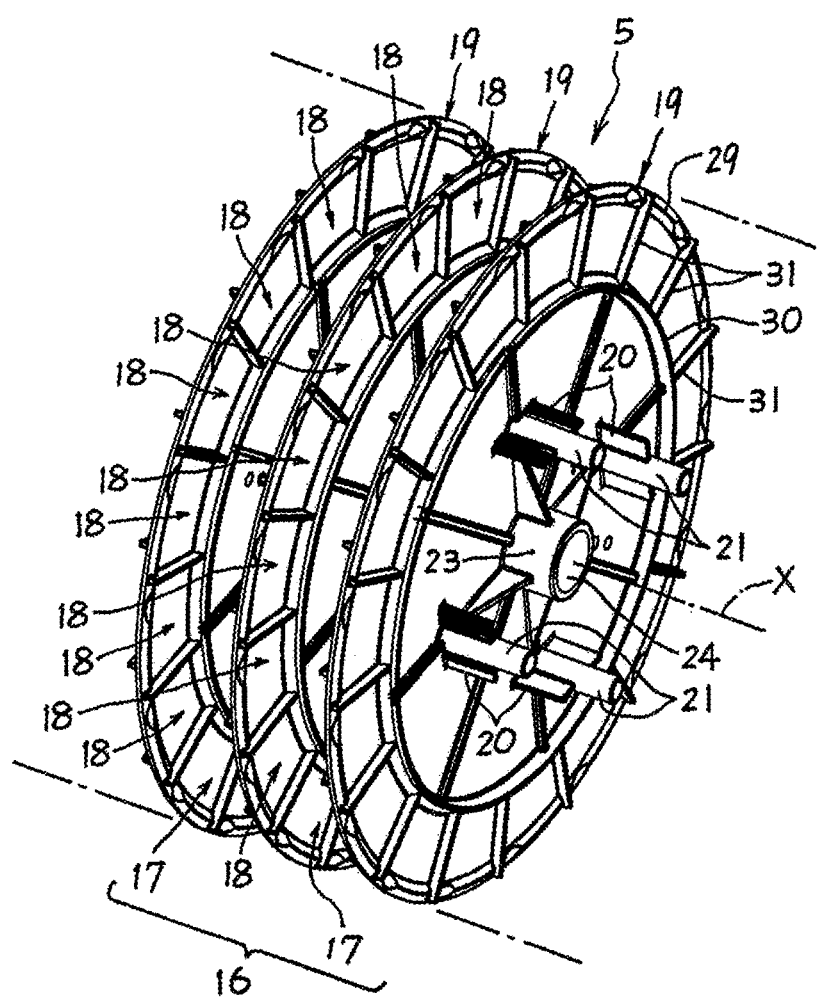
FIG. 4 is an enlarged perspective view of a part of the ball collecting drum in FIG. 2.

As illustrated in FIG. 4, the ball collecting drum 5 includes a multi-row groove 16 having an annular shape, which is formed on an outer periphery. Each of annular grooves 17 for forming the multi-row groove 16 has ball pockets 18, which are continuously formed and have such elasticity as to allow entry and exit of balls B. As illustrated in FIG. 3, each of the ball pockets 18 has such a size that only one ball B is allowed to be held therein. The ball pockets 18 are formed so that positions of the ball pockets 18 of one of the annular grooves 17, 17 adjacent to each other and positions of the ball pockets 18 of another one of the annular grooves 17, 17 are deviated from each other in a circumferential direction of the annular grooves 17.

As can be understood with reference to FIG. 4, the ball collecting drum 5 is formed of an assembly of a plurality of discs 19, each having the same structure. The annular grooves are formed at equal intervals between the discs 19, 19 adjacent to each other. Each of the discs 19 has a plurality of mounting shaft portions 21 formed on one of surfaces. Each of the mounting shaft portions 21 has a spacer 20. Each of the discs 19 has shaft-portion receiving holes (not shown) formed in another one of the surfaces. The shaft-portion receiving holes are configured to receive the mounting shaft portions 21. The plurality of discs 19 are arranged at equal intervals and integrated with each other by coupling the mounting shaft portions 21 of one of the discs 19, 19 adjacent to each other and the shaft-portion receiving holes of another of the discs 19, 19 to each other. The annular groove 17 is formed by the spacers 20 between the discs 19, 19 adjacent to each other. A boss portion 23 configured to receive a spindle 22 (see FIG. 3) is formed at a center of each of the discs 19. An assembly of the boss portions 23 forms a spindle insertion hole 24 in the ball collecting drum 5. The spindle 22 (see FIG. 3) to be inserted into the spindle insertion hole 24 is pivotably supported by the frame 9.

Figure 5:
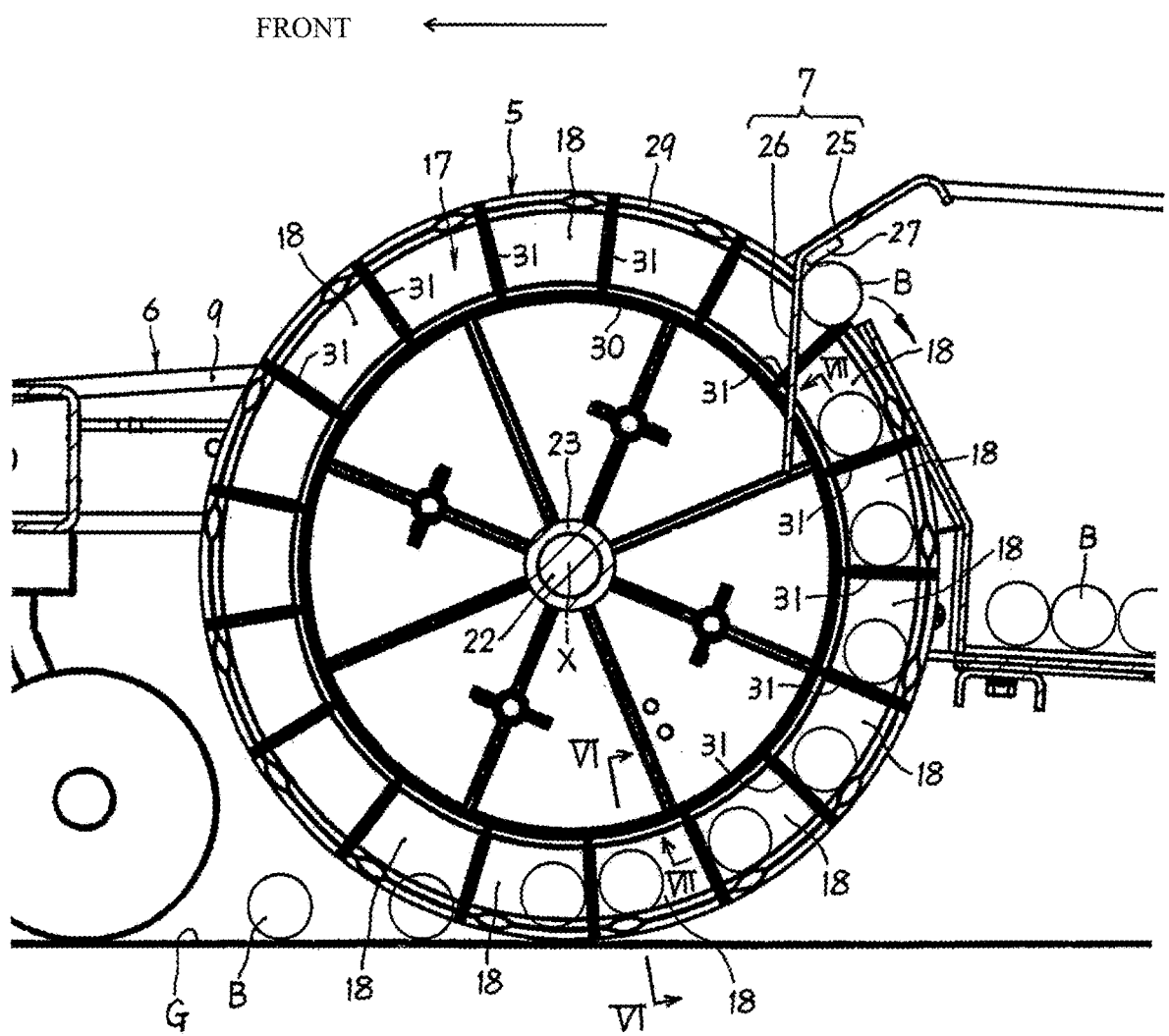
FIG. 5 is an enlarged view of a main part of FIG. 3.

As illustrated in FIG. 5, the ball releasing part 7 is fixed to the frame 9 of the traveling machine body 6. As described later, the ball releasing part 7 is configured to forcibly release the balls B held in the ball pockets 18 at predetermined angular positions on the outer periphery of the ball collecting drum 5 in cooperation with partition ridges 31 for defining the ball pockets 18.

The ball releasing part 7 is a member having a comb-like shape as a whole. The ball releasing part 7 includes a base portion 25 and a plurality of ball release projections 26. The base portion 25 extends in the right-and-left direction of the traveling machine body 6. The plurality of ball release projections 26 are formed at equal intervals and extend in parallel to each other from the base portion 25. Each of the intervals between the ball release projections 26 is equal to each of the intervals between the discs 19 of the ball collecting drum 5. The base portion 25 of the ball releasing part 7 is fixed to the frame 9 at a position above the ball collecting drum 5. The ball release projections 26 are inserted in the annular grooves 17 of the ball collecting drum 5, respectively.

A contact-type count sensor 27 configured to count the number of balls B released from the ball pockets 18 by the ball release projections 26 is arranged at the base portion 25 of the ball releasing part 7. The count sensor 27 extends in the right-and-left direction along the base portion 25 of the ball releasing part 7, and has a length corresponding to a length of the ball collecting drum 5 in an axial direction of the ball collecting drum 5. The count sensor 27 is arranged on trajectories of the balls B guided in a radiation direction of the ball collecting drum 5 by the ball release projections 26 of the ball releasing part 7 and the partition ridges 31. With the arrangement described above, the balls B released from the ball collecting drum 5 by the ball releasing part 7 reliably come into contact with the count sensor 27. Thus, the balls B can be accurately counted by the count sensor 27.

As illustrated in FIG. 3 and FIG. 5, the ball collecting case 8 is arranged on a rear side of the ball releasing part 7. The ball collecting case 8 is supported on the frame 9 of the traveling machine body 6, and is configured to accommodate the balls B released from the ball collecting drum 5 by the ball releasing part 7. As illustrated in FIG. 3, a bottom plate 8a of the ball collecting case 8 is mounted so as to be vertically translocatable. When the bottom plate 8a is moved to a lower position, specifically, a ball ejecting position, a gap is formed between the bottom plate 8a of the ball collecting case 8 and a rear plate 28. Through the gap, the ball B is ejected.

Figure 6:
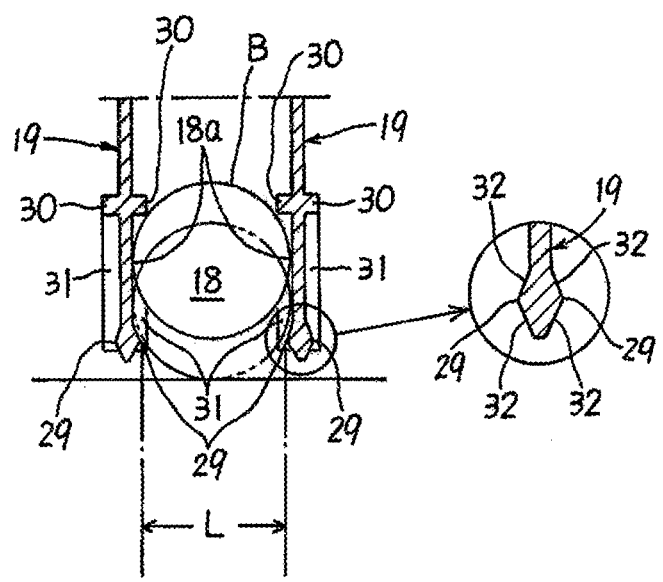
FIG. 6 is a sectional view taken along the line VI-VI of FIG. 5 as seen in the direction indicated by the arrows.
Figure 7:
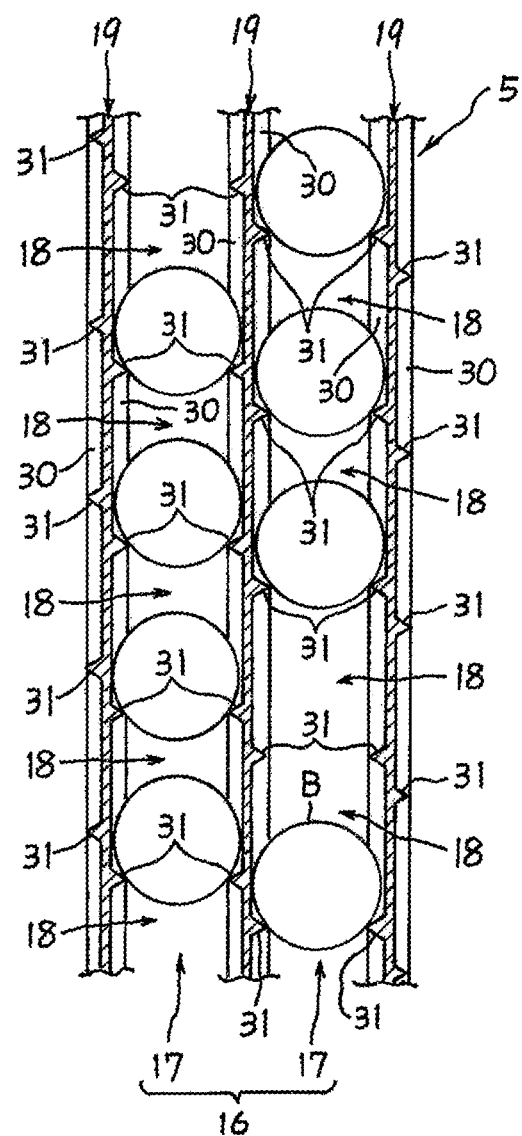
FIG. 7 is an explanatory view for illustrating a part of the ball collecting drum taken along the line VII-VII of FIG. 5 in a circumferential direction of the ball collecting drum in a two-dimensionally developed manner as seen in the direction indicated by the arrows.

As can be seen in FIG. 4, FIG. 6, and FIG. 7, an outer ridge 29, an inner ridge 30, and the partition ridges 31 are formed on each of surfaces of each of the discs 19 for forming the ball collecting drum 5. The outer ridge 29 extends in the circumferential direction of each of the discs 19, and the inner ridge 30 also extends in the circumferential direction. The partition ridges 31 extend in the radiation direction between the outer ridge 29 and the inner ridge 30. The annular groove 17 having a bottom portion defined by the inner ridges 30 is formed between the discs 19, 19 adjacent to each other. The ball pockets 18 are defined and formed in the annular groove 17 by the outer ridges 29, the inner ridges 30, and the partition ridges 31. Each of the outer ridges 29, the inner ridges 30, and the partition ridges 31 has a function as a rib configured to provide a strength required for the ball holding drum 5 to each of the discs 19, each having a thin plate-like shape.

As described above, each of the ball pockets 18 has such a size that only one ball B can be held therein. Further, as illustrated in FIG. 6, inner surfaces 18a of each of the ball pockets 18, which are opposed to each other (opposed side surfaces of the discs 19, 19 adjacent to each other), are flat surfaces. A width of each of the ball pockets 18 is set so that the ball B can be moved along the flat surfaces 18a inside the corresponding ball pocket 18. Each of the discs 19 is made of a lightweight material having high durability such as plastic, and includes a portion having elastic deformability at least on a radially outer side of the inner ridge 30. Owing to the elastic deformability of each of the discs 19, the entry and the exit of the ball B into and from each of the ball pockets 18 are allowed, and the ball B can be held in each of the ball pockets 18.

As illustrated in FIG. 6, the outer ridges 29 project outward in a thickness direction of each of the discs 19 from an outer peripheral edge of each of the discs 19. The outer ridges 29 define an inlet/outlet portion of each of the ball pockets 18, of which the ball B cannot fall out. A protruding height of each of the outer ridges 29 is set so that a distance L between the outer ridges 29, 29 of the discs 19, 19 adjacent to each other is slightly smaller than a diameter of the ball B. With the above-mentioned setting of the distance L, the entry and the exit of the ball B into and from a corresponding one of the ball pockets 18 through a gap between the outer ridges 29, 29 are allowed owing to the elastic deformability of the discs 19. At the same time, once the ball B enters the ball pocket 18, the ball B is held inside the ball pocket 18 unless a forced release action is exerted by the ball releasing part 7.

As illustrated in FIG. 6 in an enlarged manner, it is suitable that a peripheral edge of each of the discs 19 have a rhombic sectional shape having a long axis directed in the radial direction of the disc 19 by forming the outer ridges 29 on both surfaces of each of the discs 19. With the shape described above, each of the outer ridges 29 for defining the inlet/outlet portion for the ball B has such an inclined surface 32 that gradually narrows the inlet/outlet portion for the ball B in a direction of movement of the ball B. Thus, even when the ball B enters the ball pocket 18 and the ball B is forcibly released from the ball pocket 18, smoothness of the entry and the exit of the ball B into and from each of the ball pockets 18 can be improved while holding performance of the ball pockets 18 for the balls B is maintained.

As illustrated still in FIG. 6, the inner ridge 30 is formed on an inner side of the outer ridge 29 in the radial direction of the disc 19 so as to be away from the outer ridge 29 by a distance substantially equal to the diameter of the ball B. The inner ridges 30 protrude outward from the side surfaces of each of the discs 19 in the thickness direction of the disc 19. The inner ridges 30 define a bottom portion of the ball pocket 18. Thus, each of the inner ridges 30 does not have a height restriction as severe as that for each of the outer ridges 29, and is only required to have such a height that the gap into which each of the ball release projections 26 of the ball releasing part 7 can be inserted is formed between the inner ridges 30, 30 of the discs 19, 19 adjacent to each other.

As illustrated in FIG. 4 and FIG. 5, the partition ridges 31 extend in the radiation direction between the outer ridge 29 and the inner ridge 30, and partition each of the annular grooves 17 at equiangular intervals in the circumferential direction to define the ball pockets 18. In the illustrated example, each of the annular grooves 17 is partitioned by the partition ridges 31 into seventeen ball pockets 18. The number of ball pockets 18 defined in each of the annular grooves 17 is not limited. However, each of the ball pockets 18 is required to have such a size that only one ball B is held therein so that the ball B can be reliably released from each of the ball pockets 18 by cooperation between the ball releasing part 7 and the partition ridges 31.

As illustrated in FIG. 7, the ball pockets 18 in one of the annular grooves 17, 17 adjacent to each other and the ball pockets 18 in another one of the annular grooves 17, 17 are formed so that positions of the ball pockets 18 are deviated from each other in the circumferential direction of the annular grooves 17. In the illustrated example, the partition ridges 31 formed at the equiangular intervals on one of the surfaces of the disc 19 and the partition ridges 31 formed at the equiangular intervals on another one of the surfaces of the disc 19 are deviated from each other in the circumferential direction. Thus, when the plurality of discs 19, each having the same structure, are assembled so that the positions of the partition ridges 31 formed on one of the discs 19, 19 adjacent to each other and the positions of the partition ridges 31 formed on another one of the discs 19, 19 are opposed to each other and match with each other in the circumferential direction, the ball pockets 18 of one of the annular grooves 17, 17 adjacent to each other and the ball pockets 18 of another one of the annular grooves 17, 17 can be formed so that the positions of the ball pockets 18 are deviated from each other in the circumferential direction of the annular grooves 17. Thus, the ball collecting drum 5 is easily manufactured.

In the example of FIG. 7, each of the partition ridges 31 has a triangular sectional shape. However, the sectional shape of each of the partition ridges 31 is not limited to the triangle, and may be, for example, a trapezoid, a rectangle, or a semi-circle. The sectional shape and a protruding height of each of the partition ridges 31 are set in such a mode that the balls B can be smoothly guided toward the count sensor 27.

As illustrated in FIG. 5, when the traveling machine body travels forward, the ball collecting drum 5, which is constantly held in contact with the ground surface G and is idly rotatable, is rotated in a counterclockwise direction in FIG. 5. As a result, the plurality of balls B, which are scattered on the ground surface G, enter the ball pockets 18 and are held therein owing to the elastic deformability of the ball pockets 18. The balls B, which have been held in the ball pockets 18, are transferred upward through the rotation of the ball collecting drum 5 along with the forward travel of the traveling machine body 6, and come into contact with the ball release projections 26 of the ball releasing part 7. Through the further rotation of the ball collecting drum 5, the balls B in the ball pockets 18 are guided upward along the partition ridges 31 located on the rear side in a rotating direction of the ball collecting drum 5, and come into contact with the count sensor 27. After that, the balls B drop into the ball collecting case 8.

In the ball picker 1 according to this embodiment, the ball pockets 18 of one of the annular grooves 17, 17 of the ball collecting drum 5, which are adjacent to each other, and the ball pockets 18 of another one of the annular grooves 17, 17 are located at the positions deviated from each other in the circumferential direction of the annular grooves 17. Thus, the balls B in the ball pockets 18 of the one of the annular grooves 17, 17 adjacent to each other and the balls B in the ball pockets 18 of the another one of the annular grooves 17, 17 are held at the positions deviated from each other in the circumferential direction of the annular grooves 17. Thus, unlike the related-art ball picker described above in Description of the Related Art, the balls are not simultaneously held in the annular grooves adjacent to each other at such positions that the balls are lined up in the axial direction of the ball collecting drum 5. Thus, a ball holding force does not become excessively large at the time of release from the ball pockets 18. Thus, the balls B are reliably released by the ball releasing part 7.

Further, in all the plurality of annular grooves 17, the balls B are not simultaneously held or are less liable to be simultaneously held at such positions that the balls B are lined up in the axial direction of the ball collecting drum 5. Thus, timings to release the plurality of balls B by the ball releasing part 7 are less liable to match with each other. Thus, a problem such as unintentional stop of the rotation of the ball collecting drum 5 does not occur.

Further, as illustrated in FIG. 6, the inner surfaces 18a, 18a of each of the ball pockets 18, which are opposed to each other, are flat surfaces. The ball B can be moved along the flat surfaces inside each of the ball pockets 18. Thus, the balls B can be more reliably released by the ball releasing part 7.

Further, the peripheral edge of each of the discs 19 for forming the annular groove 17 is formed to have a rhombic sectional shape having a long axis directed in the radial direction of the disc 19. Thus, the smoothness of the entry and the exit of the ball B into and from each of the ball pockets 18 can be improved while maintaining the holding performance of each of the ball pockets 18 for the ball B.

Further, as illustrated in FIG. 5, the count sensor 27 is arranged on the trajectories of the balls B to be guided in the radiation direction by the ball release projections 26 of the ball releasing part 7 and the partition ridges 31. Thus, the balls B released from the ball collecting drum 5 by the ball releasing part 7 reliably come into contact with the count sensor 27. Thus, the number of collected balls B can be accurately grasped. Further, the ball pockets 18 of one of the annular grooves 17 adjacent to each other and the ball pockets 18 of another one of the annular grooves 17 adjacent to each other are formed at positions deviated from each other in the circumferential direction of the annular grooves 17. Thus, the balls B in the ball pockets 18 of the one of the annular grooves 17 adjacent to each other and the balls B in the ball pockets 18 of another one of the annular grooves 17 adjacent to each other come into contact with the count sensor 27 at timings different from each other. Thus, the balls B can be accurately counted by the count sensor 27.

As another embodiment of this disclosure, the traveling machine body 6 may be not only a self-propelled type one to be driven by motive power but also be, for example, a handcart-type one or a pull-type one to be driven by human power. The ball collecting drum 5 itself may have a rotational driving force.

Further, in place of the inner ridges for defining the bottom portions of the ball pockets 18, each of the bottom portions of the ball pockets 18 may be fully covered. In this case, the ball release projections 26 of the ball releasing part 7 has lower ends arranged so as to come into contact with the bottom portions of the ball pockets 18, respectively.

The embodiments of this disclosure have been described in detail with reference to the drawings. However, a specific configuration is not limited to those of the embodiments described above. For example, changes in design without departing from the scope of this disclosure are encompassed in this disclosure. Further, technologies in the above-mentioned embodiments described above may be used in combination as long as there is no particular contradiction or problem in, for example, purpose and configuration.

What is claimed is:

1. A ball collecting drum, which is configured to roll on a surface to collect a plurality of balls on the surface, the ball collecting drum comprising:
   a plurality of discs;
   an annular multi-row groove including annular grooves formed between adjacent discs of the plurality of discs; and
   ball pockets formed, on an outer periphery of each of the plurality of discs, in the annular groove formed between the adjacent plurality of discs,
   the ball pockets each having elasticity to allow entry and exit of a ball and being continuously formed,
   the ball pockets each having a size so that only one ball is allowed to be held therein,
   the ball pockets formed in the adjacent annular grooves being formed at positions deviated from each other in a circumferential direction of the annular grooves.

2. The ball collecting drum according to claim 1,
   wherein an inner surface of each of the ball pockets, which are opposed to each other, has a flat surface, and
   wherein each of the ball pockets has a width so that the ball is allowed to move along the flat surface in each of the ball pockets.

3. The ball collecting drum according to claim 1, wherein a peripheral edge of each of the plurality of discs is formed to have a rhombic sectional shape having a long axis in a radial direction of the disc.

4. The ball collecting drum according to claim 1,
   wherein the multi-row groove is formed of an assembly of the plurality of discs, each having the same structure,
   wherein ridges extending in a radiation direction of each of the plurality of discs, which are configured to define and form the ball pockets, are arranged on both surfaces thereof so as to have equal angles at a pivot of each of the plurality of discs, and
   wherein the ridges formed on the respective surfaces of the plurality of discs are formed at positions deviated from each other in a circumferential direction of the plurality of discs.

5. A ball picker, comprising:
   a machine body, which is movable and includes the ball collecting drum of claim 1;
   a ball releasing part, which is arranged on the machine body so as to be inserted into the annular grooves, and is configured to release a ball picked up by the ball collecting drum from the ball collecting drum; and
   a collecting case configured to accommodate the ball released by the ball releasing part.

6. The ball picker according to claim 5, further comprising a contact-type count sensor configured to count the number of balls released from the ball collecting drum,
   wherein each of the annular grooves is formed between the discs adjacent to each other,
   wherein ridges extending in a radiation direction of the discs, which are configured to define and form the ball pockets, are formed on respective surfaces of the discs adjacent to each other, the surfaces being opposed to each other, and wherein the count sensor is arranged on trajectories of the balls to be guided in the radiation direction by the ball releasing part and the ridges.

\* \* \* \* \*